United States Patent
Ramalingam et al.

(10) Patent No.: US 9,836,315 B1
(45) Date of Patent: Dec. 5, 2017

(54) DE-REFERENCED PACKAGE EXECUTION

(71) Applicant: Amazon Technologies, Inc., Reno, NV (US)

(72) Inventors: Harsha Ramalingam, Kirkland, WA (US); Bhavnish H. Lathia, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/314,205

(22) Filed: Jun. 25, 2014

(51) Int. Cl.
*G06F 9/44* (2006.01)
*G06F 9/445* (2006.01)
*G06F 11/36* (2006.01)

(52) U.S. Cl.
CPC ...... *G06F 9/44521* (2013.01); *G06F 11/3688* (2013.01); *G06F 8/30* (2013.01); *G06F 9/445* (2013.01); *G06F 11/3664* (2013.01)

(58) Field of Classification Search
CPC ........ G06F 8/30; G06F 9/445; G06F 11/3664; G06F 11/3688
See application file for complete search history.

(56) References Cited

U.S. PATENT DOCUMENTS

| | | | | |
|---|---|---|---|---|
| 7,610,578 B1* | 10/2009 | Taillefer | ............ | G06F 8/30 717/124 |
| 7,908,391 B1* | 3/2011 | Satish | ............ | G06F 9/445 709/206 |
| 8,010,701 B2* | 8/2011 | Wilkinson | ............ | G06F 9/505 709/217 |
| 8,402,049 B2* | 3/2013 | Miyajima | ............ | G06F 17/30902 707/661 |
| 8,510,369 B1* | 8/2013 | Ekke | ............ | G06F 9/45558 709/201 |
| 8,892,947 B1* | 11/2014 | Chopra | ............ | G06F 11/3688 714/32 |
| 8,935,429 B2* | 1/2015 | Wilkinson | ............ | G06F 9/468 709/217 |
| 9,110,496 B1* | 8/2015 | Michelsen | ............ | G06F 1/00 |
| 9,405,515 B1* | 8/2016 | Bertram | ............ | G06F 8/41 |

(Continued)

OTHER PUBLICATIONS

Jung et al., "Efficient Remote Software Execution Architecture based on Dynamic Address Translation for Internet-of-Things Software Execution Platform", IEEE, Sep. 2015, pp. 371-378; <http://ieeexplore.ieee.org/stamp/stamp.jsp?arnumber=7350646>.*

(Continued)

*Primary Examiner* — Thuy Dao
*Assistant Examiner* — Ben C Wang
(74) *Attorney, Agent, or Firm* — Lee & Hayes, PLLC

(57) ABSTRACT

A library registry service receives a library interface definition that defines an interface for a library stub and data indicating whether a corresponding package is to be executed locally or remotely. An application is then built using the library stub. When the application calls the library stub, the library stub determines whether the package is to be executed locally or remotely either dynamically or by consulting the library registry service. The library stub then causes the package to be executed in the determined location. An updated library may be periodically generated and deployed for execution by the library stub locally or remotely. The library stub might also batch calls and/or provide a control interface for configuring aspects of its operation.

20 Claims, 9 Drawing Sheets

(56) References Cited

U.S. PATENT DOCUMENTS

| | | | |
|---|---|---|---|
| 2005/0240906 A1* | 10/2005 | Kinderknecht et al. | 717/136 |
| 2006/0159077 A1* | 7/2006 | Vanecek | G06F 8/30 370/360 |
| 2007/0156876 A1* | 7/2007 | Sundarrajan et al. | 709/223 |
| 2007/0239859 A1* | 10/2007 | Wilkinson | G06F 9/505 709/220 |
| 2007/0261044 A1* | 11/2007 | Clark | 717/162 |
| 2008/0016499 A1* | 1/2008 | Jones et al. | 717/124 |
| 2008/0127200 A1* | 5/2008 | Richards | G06F 11/3664 718/106 |
| 2008/0201568 A1* | 8/2008 | Quinn et al. | 713/1 |
| 2010/0077378 A1* | 3/2010 | Maguire | G06F 9/547 717/106 |
| 2011/0295874 A1* | 12/2011 | Miyajima | G06F 17/30902 707/769 |
| 2012/0072927 A1* | 3/2012 | Faust | G06F 9/547 719/330 |
| 2012/0096365 A1* | 4/2012 | Wilkinson | G06F 9/468 715/740 |
| 2012/0117651 A1* | 5/2012 | Edery et al. | 726/24 |
| 2012/0167013 A1* | 6/2012 | Kaiser | G06F 11/3664 715/846 |
| 2012/0198413 A1* | 8/2012 | Dang | G06F 8/71 717/101 |
| 2012/0226737 A1* | 9/2012 | Rajaraman et al. | 717/115 |
| 2012/0331463 A1* | 12/2012 | Orveillon | G06F 8/63 718/1 |
| 2013/0054669 A1* | 2/2013 | Nachreiner et al. | 709/201 |
| 2013/0086594 A1* | 4/2013 | Cottrell | 719/313 |
| 2014/0123248 A1* | 5/2014 | Balakrishnan et al. | 726/5 |
| 2014/0325499 A1* | 10/2014 | Jawa | G06F 21/54 717/171 |
| 2015/0026658 A1* | 1/2015 | Jones | 717/108 |
| 2015/0052509 A1* | 2/2015 | Wang | G06F 9/44526 717/168 |
| 2015/0089492 A1* | 3/2015 | Kruglick | 717/177 |
| 2015/0127774 A1* | 5/2015 | Hitomi | H04L 65/60 709/219 |
| 2015/0128293 A1* | 5/2015 | Hitomi | H04L 65/60 726/29 |
| 2015/0169386 A1* | 6/2015 | Gopalraj et al. | 717/115 |
| 2015/0242645 A1* | 8/2015 | Burger | G06F 9/445 726/16 |
| 2016/0283291 A1* | 9/2016 | Mettrick | G06F 9/541 |
| 2017/0034023 A1* | 2/2017 | Nickolov | H04L 43/0817 |
| 2017/0192878 A1* | 7/2017 | Clark | G06F 11/3664 |

OTHER PUBLICATIONS

Hedi et al., "JSFlow: Tracking Information Flow in JavaScript and its APIs", ACM, SAC'14, Mar. 2014, pp. 1-9; <http://dl.acm.org/citation.cfm?id=2554909&CFID=968133826&CFTOKEN=57638951>.*

Josée Martens, "Execute on a remote Microsoft R Server using the mrsdeploy package", Jul. 2017, Microsoft Azure, pp. 1-11; <https://docs.microsoft.com/en-us/r-server/r/how-to-execute-code-remotely>.*

U.S. Appl. No. 14/012,520, filed Aug. 28, 2013, Johansson et al.

Web Article: "Library (computing)" published by Wikipedia [online][retrieved on: May 15, 2014] retrieved from: http://en.wikipedia.org/wiki/Library_(computing), 11 pps.

* cited by examiner

DE-REFERENCED PACKAGE EXECUTION

BACKGROUND

A software library ("a library") is a software implementation of functionality that has a well-defined interface through which the provided functionality can be invoked. Application developers commonly utilize libraries in their applications so that they do not have to implement the functionality provided by the libraries themselves. For example, a library might be created that implements client-side functionality through which an application can access functionality provided by a remote storage service or another type of network service. An application developer might utilize such a library in an application in order to access the functionality provided by the remote storage service or other type of service without creating an implementation of his or her own.

One challenge associated with the use of software libraries stems from the fact that each time a library is updated, applications that utilize the library might also need to be updated. Additionally, in environments where applications that utilize software libraries are executed remotely, such as where applications are executed on server computers in a distributed computing environment, it might also be necessary to re-deploy the applications once they have been rebuilt to use an updated library. This process can be time-consuming and inconvenient for application developers and maintainers.

It is with respect to these and other considerations that the disclosure made herein is presented.

DETAILED DESCRIPTION

Figure 1:
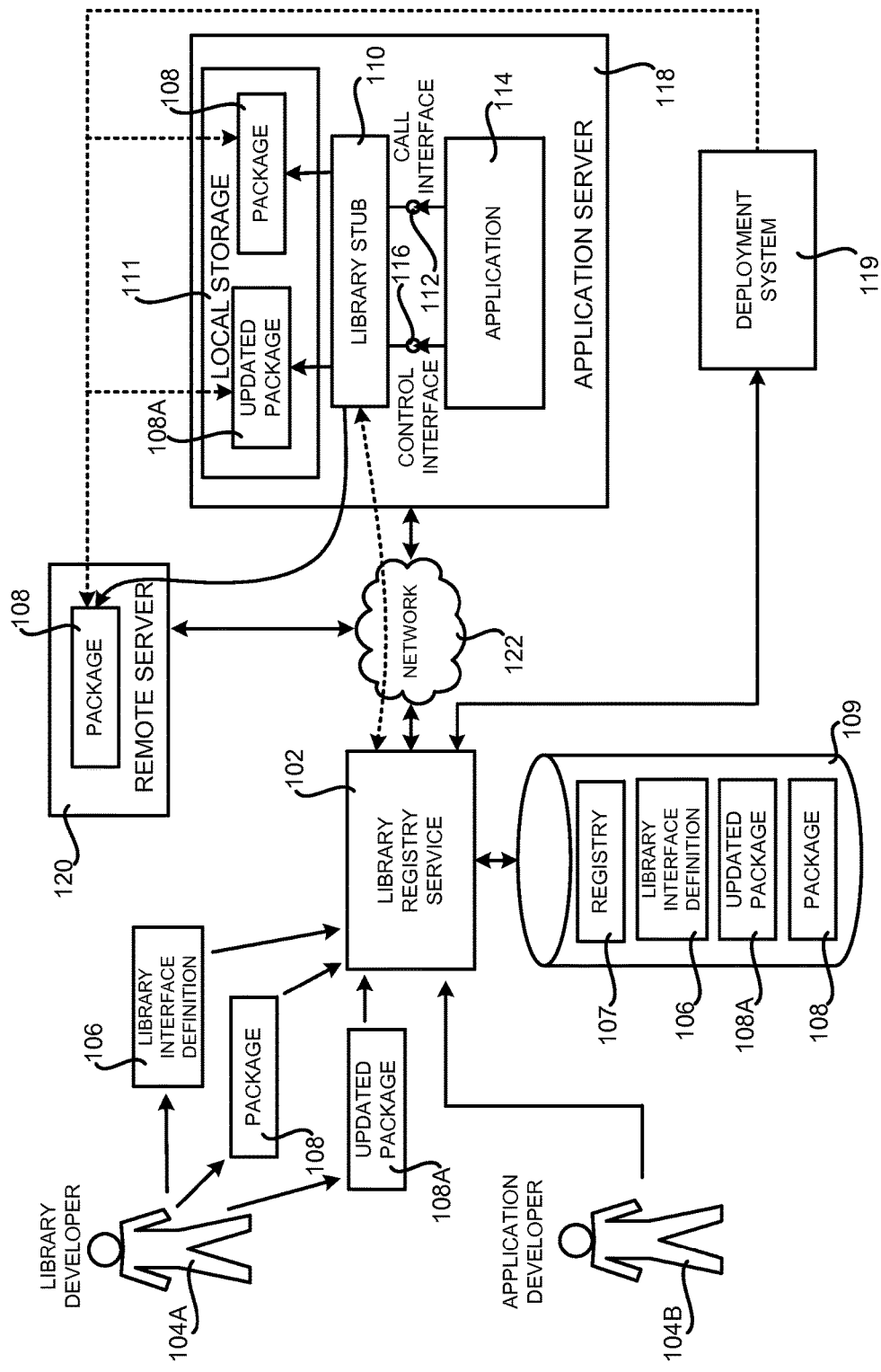
FIG. 1 is a system diagram showing aspects of the operation of several software components disclosed herein for de-referenced execution of packages, according to one embodiment disclosed herein.

The following detailed description is directed to technologies for de-referenced package execution. Through an implementation of the technologies disclosed herein, execution of program code utilized by an application, such as a package, can be performed in a manner that likely reduces, and potentially eliminates, the need to rebuild and re-deploy the application following a change to the program code utilized by the application.

According to one embodiment disclosed herein, a library registry service is configured to provide functionality for enabling the de-referenced execution of one or more software packages. De-referenced execution refers to a process by which a version of a package can be selected and executed locally or remotely at the time an application makes a call to access functionality provided by the package. As used herein, the term "package" refers to one or more software objects that may be called to implement desired functionality. For example, and without limitation, a package may be directly executable code, dynamically linkable program code, plug-ins, scripts, or other types of translatable or interpretable program code.

In order to provide the functionality described briefly above, the library registry service may receive an interface definition for a library stub. The interface definition defines an interface that can be utilized to call (i.e. execute) the library stub to access functionality provided by an associated package. A software developer may, for example, register an interface definition for a library stub with the library registry service utilizing an appropriate user interface ("UI"), an appropriate application programming interface ("API"), or another type of interface.

The software developer may also provide the package that implements the functionality corresponding to the provided interface definition and an indication as to whether the package is to be executed locally (i.e. on the same computing device upon which the application and the library stub are executing) or remotely (i.e. on a computing device that is remote from the computing device upon which the application and the library stub are executing). In some embodiments, the library registry service provides functionality for hosting the package. Alternately, the package might be hosted in another location. The library registry service might also maintain a registry or other type of data store that stores data regarding each registered interface, including data indicating whether the corresponding package is to be executed locally or remotely. If the package is to be executed remotely, the registry might also store data identifying the remote location at which the package is to be executed.

A software developer might also generate and provide a library stub for use by an application developer. In an alternate embodiment, the library registry service or another component generates the library stub for the package based upon the supplied interface definition. The library stub provides functionality for de-referenced execution of the package in response to a call from an application program.

In this way, changes to the package do not require rebuilding or redeploying the application. In order to enable this functionality, the library stub may be provided to an application developer for use by an application that is configured to utilize the package. For instance, the library stub might be implemented as a library that an application utilizes to access functionality provided by the package.

When an application makes a call to the library stub, the library stub receives the call and resolves the location at which the library is to be executed. For example, the library stub may make a call to the library registry service to determine whether the package is to be executed locally or remotely. The library stub may cache data received from the library registry service indicating whether the package is to be executed locally or remotely. The cached data may be utilized to determine whether future calls are to be executed locally or remotely without making a call to the library registry service. Various mechanisms may be utilized to update the contents of the cache. For example, if the data stored at the library registry service indicating whether a particular package is to be executed locally or remotely is changed, an instruction may be transmitted to the library stub to invalidate or otherwise update the contents of its cache.

In another embodiment, the library stub may determine whether to execute the package locally or to execute the package remotely based upon one or more factors. For example, and without limitation, the library stub may determine whether to execute the package remotely or locally based upon the current status of the computing device upon which the library stub is executing or the computing device upon which the library registry service is executing, the frequency of calls to the package, the size of the response generated by the package and/or other factors, conditions, or considerations.

If the library stub determines that the package is to be executed locally, the library stub may cause the package to be executed locally (i.e. on the same computing device upon which the library stub is executing) in response to the call. If the library stub determines that the package is to be executed remotely, the library stub may cause the package to be executed at the remote location specified by the library registry service. For example, a remote procedure call may be made to execute the remotely located package.

In some embodiments, a call to the library stub includes a version identifier ("ID") specifying a version of the package that is to be executed. In these embodiments, the library stub is configured to cause the specified version of the package to be executed locally or remotely. In other embodiments, the call may not specify a version ID for the package to be executed. In these embodiments, the library stub may execute the latest version of the package or dynamically identify a version of the package to execute in response to the call. For example, the library registry service may store data indicating the version of the package that is to be executed and provide this information to the library stub for use in selecting the version of the package for execution.

In some embodiments, the library stub is configured to batch calls from an application. For example, the library stub may batch two or more calls from the application prior to remotely executing the package. When a predefined number of calls have been batched, the library stub may then cause the batched calls to be executed against the remotely located package. The library stub might also de-duplicate batched calls in some embodiments.

In some embodiments, the library stub is also configured to provide a control interface for receiving commands to configure aspects of the operation of the library stub. For example, and without limitation, the control interface might be utilized to configure the library stub to log calls to the library stub, to trigger one or more events in response to receiving a call, to perform a service call in response to receiving a call, to execute a plug-in to the library stub in response to receiving a call, to pre-load a version of the library into local storage, and/or to provide other functionality. Additional details regarding the implementation and operation of the technologies disclosed herein for de-referenced package execution are provided below with regard to FIGS. 1-9.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 is a system diagram showing aspects of the operation of several software components disclosed herein for de-referenced execution of packages, according to one embodiment disclosed herein. In particular, and as shown in FIG. 1, a library registry service 102 is provided in one embodiment that is configured to provide functionality for enabling the de-referenced execution of one or more software libraries, such as the software package 108. As discussed above, de-referenced execution refers to a process by which a version of a package, such as the package 108, can be selected and executed locally or remotely at the time an application 114 makes a call to a library stub 110 associated with the package. As also discussed above, a "package" is one or more software objects that may be called to implement desired functionality. For example, a package may be directly executable code, dynamically linkable program code, plug-ins, scripts, or other types of translatable or interpretable program code.

In order to provide the functionality described above and in further detail below, a library developer 104A may generate a library interface definition 106 (which may be referred to herein as an "interface definition") corresponding to a package 108 and provide the interface definition 106 to the library registry service 102. As discussed briefly above, the interface definition 106 defines an interface that can be utilized to call (i.e. execute) functionality provided by the package 108. The interface definition 106 does not, however, implement the functionality provided by the package 108.

The library registry service 102 might provide an appropriate UI, API, or other type of interface through which a developer 104 can register an interface definition 106. The library registry service 102 might also provide an appropriate UI, API, or other type of interface through which the developer 104 can also provide the package 108 that implements the functionality corresponding to the provided interface definition 106.

In some embodiments, the library registry service 102 provides functionality for hosting the package 108. For example, and without limitation, the library registry service 102 might store the package 108 and its associated interface definition 106 in an appropriate data store 109. The package 108 might be hosted in another location, or locations, in other embodiments. For example, the package 108 might be hosted by a software deployment system 119.

As also discussed briefly above, the library developer 104A also generates a library stub 110 for the package 108. In some embodiments, the library registry service 102, or another component may be configured to generate the library stub 110 for the package 108 based upon the associated interface definition 106. As described briefly above, the library stub 110 also provides functionality for de-referenced execution of the package 108 in response to a call to the call interface 112 from an application program 114. In this way, changes to the package 108 do not require rebuilding or redeploying the application 114.

The library developer 104A may also provide data to the library registry service 102 in some embodiments indicating whether the package 108 is to be executed remotely, such as on a remote server 120, or locally. If the package 108 is to be executed remotely, the library developer 104A may also specify the remote location at which the package 108 is to be executed, such as the network address of a remote server 120, or servers, at which the package 108 is to be executed. The library registry service 102 might store this information in a registry 107 or another suitable location. The library developer 104A might also provide information to the library registry service 102 indicating a version of the package 108 that is to be executed. This information might also be stored in the registry 107 or in another suitable location.

The deployment system 119 might utilize the information provided by the library developer 104A to deploy the package 108 to the appropriate location, or locations for execution. If the library developer 104A later provides an updated package 108A, the deployment system 119 might deploy the updated package 108A to the same locations for execution. The deployment system 119 might also inform the library registry service 102 of the actual locations to which the package 108 has been successfully deployed. This information might also be stored in the registry 107 or in another suitable location.

In order to utilize the functionality described above, an application developer 104B may build an application 114 using the library stub 110. As described briefly above, the library stub 110 might be implemented as a library that can be included in and called by the application 114. The application 114 is then also deployed, such as for instance to an application server 118 or servers. It should be appreciated that the application server 118 shown in FIG. 1 is merely illustrative and that the library stub 110 might be executed on other types of computing devices.

The application developer 104B might also register with the library registry service 102 as a user of the package 108. For example, the library registry service 102 might provide an appropriate interface through which the application developer 104B can indicate that the application 114 uses the package 108. This information might also be stored in the registry 107. This information might also be provided to the deployment system 119 for use in deploying the package 108 to application servers 118 utilized by the application developer 104B to execute the application 114. The library registry service 102 might also provide access to the library stub 110 to the developer 104B following registration in some embodiments.

When the application 114 is executed and makes a call to the call interface 112, the library stub 110 receives the call and transparently resolves the location at which the package 108 is to be executed. For example, and without limitation, the library stub 110 may determine whether to execute the package 108 locally (i.e. execute the library from local storage 111 of the computing device upon which the application 114 and the library stub 108 are executing) or to execute the package 108 remotely (i.e. on a server 120 or other type of computing device that is remote from the computing device upon which the application 114 and the library stub 110 are executing).

In order to determine whether the package 108 is to be executed locally or remotely, the library stub 110 may perform a call to the library registry service 102. As discussed above, the library registry service 102 may maintain a registry 107 indicating whether packages are to be executed locally or remotely. If a package 108 is to be executed remotely, the library registry service 107 might also store data identifying the remote network location of the package 108. Information indicating whether the package 108 is to be executed locally or remotely is provided from the library registry service 102 to the library stub 110 in response to the request from the library stub 110. If the package 108 is to be executed remotely, the location at which the package 108 is to be executed is also provided.

In some configurations, the library stub 110 caches the data received from the library registry service 102 indicating whether the package 108 is to be executed locally or remotely. The cached data may be utilized to determine whether a future call is to be executed locally or remotely without making a request to the library registry service 102. As will be described in greater detail below with regard to FIG. 4, various mechanisms might be utilized to update the contents of the cache.

In another configuration, the library stub 110, and/or another local or remote component, may evaluate various factors to determine whether the package 108 is to be executed locally or remotely. For example, and without limitation, the library stub 108 or another component may determine whether to execute the package 108 remotely or locally based upon the current status of the computing device (i.e. the application server 118 in the embodiment shown in FIG. 1) upon which the library stub 110 is executing. For example, if the computing device upon which the library stub 110 is executing is low on battery power, the library stub 110, or other component, might determine that the package 108 is to be executed remotely. Similarly, the library stub 110 might determine that the computing device upon which the package 108 is to be executed remotely, such as a computing device executing the library registry service 102 or the remote server 120, is low on computing resources or having other operational problems. In this case, the library stub 108 might determine that the package 108 is to be executed locally (i.e. on the application server 118).

The library stub 110, or another component, might also determine whether the package 108 is to be executed locally or remotely based upon the frequency of calls to the package 108 and/or the size of the response generated by calls to the package 108. For example, if many calls are made to the package 108 and/or the response size is large, the library stub 110 might determine that the package 108 is to be executed from the local storage 111. If the call frequency is low and/or the response size is small, the library stub 110 or other component might conclude that the package 108 is to be executed remotely, such as at the remote server 120. The library stub 110 and/or other components might determine whether the package 108 is to be executed locally or remotely based upon other factors or conditions. This determination might also be made on a periodic basis (e.g. every hour or day), on a per-call basis, or on another basis.

If the library stub 110 (or another component) determines that the package 108 is to be executed locally, the library stub 108 may cause the package 108 to be executed locally (i.e. on the same computing device that is executing the library stub 110) in response to the call from the application 114. If the library stub 110 determines in response to a call from the application 110 that the package 108 is to be executed remotely, the library stub 110 may then cause the package 108 to be executed at the remote location specified by the library registry service 102. For instance, in the example shown in FIG. 1, the library stub 110 might make a remote procedure call to the package 108 located at the remote server 120. Other mechanisms might also be utilized to call the package 108 remotely.

In some embodiments, the library registry service 102 is also configured to receive an updated package 108A from the library developer 104A. In response thereto, the library registry service 102 may provide the updated package 108A to the deployment system 118. For example, when the library developer 104A creates an update to the package 108, the updated package 108A might be provided to the deployment system 119 and deployed to the application server 118 and/or the remote server 120 for future execution. The updated package 108A may then be executed in the manner described above without modification of the application 114 or the library stub 110. Additional details regarding the mechanism described above for executing a package 108 locally or remotely will be provided below with regard to FIG. 3.

In some embodiments, the library stub 110 is also configured to batch calls to the package 108. For example, the library stub 110 may be configured to batch two or more calls to the package 108 prior to local or remote execution of the package 108. When a predefined number of calls to the package 108 have been batched or an instruction is received from the application 114 to execute batch calls, the library stub 110 may then cause the batched calls to be executed against the package 108. Various factors might be evaluated in some embodiments to determine whether batching of calls to the package 108 is to be employed.

It should be appreciated that the batching mechanism described briefly above, and in greater detail below with regard to FIG. 3, may be utilized to optimize remote calls to the package 108 in an effort to minimize latency cause by the remote execution of the package 108. For example, in one specific implementation, the application 114, or another component, may utilize a control interface 112 provided by the library stub 110 to request that remote calls to the package 108 be aggregated for execution. This might be useful, for instance, when individual remote calls to the package 108 can be executed in parallel on a multithreaded service, and where there is no dependency between the batched calls to the package 108.

In this configuration, the application 114 may utilize the control interface 112 to instruct the library stub 110 to batch calls to the package 108. In turn, the library stub 110 may batch the calls to the remotely located package 108 until the application 114 transmits an instruction via the control interface 112 to execute the calls. Such an implementation could be handled in an asynchronous mode of operation or an "all or nothing" batch synchronous mode. In the "all or nothing" batch synchronous mode of operation, batched calls may be executed remotely and the results of the batched calls may then be returned to the application 114 in response to the request to execute the previously batched calls to the package 108. Additional details regarding this process are also provided below with regard to FIG. 3.

In some embodiments, a call to the library stub 110 from the application 114 includes a version ID (not shown in FIG. 1) specifying a version of the package 108 that is to be executed. In these embodiments, the library stub 110 is configured to cause the specified version of the package 108 to be executed locally or remotely. In other embodiments, a call from the application 114 does not specify a version ID for the package 108 to be executed. In these embodiments, the library stub 110 may dynamically identify a version of the package 108 to execute locally or remotely in response to the call. For example, the library registry service 102 might indicate the version of the package 108 that is to be executed to the library stub 110. Additional details regarding these aspects will be provided below with regard to FIG. 5.

As also mentioned briefly above, the library stub 110 may also be configured to provide a control interface 112 for receiving commands to configure aspects of the operation of the library stub 110. For example, and without limitation, the control interface 112 might be utilized by the application 114 to configure the library stub 110 to batch execute remote calls to the package 108, to log calls to the library stub 110, to trigger one or more events in response to receiving a call, to perform a service call in response to receiving a call, to execute a plug-in to the library stub 110 in response to receiving a call and/or to provide other functionality. Additional details regarding the functionality provided by the control interface 112 will be provided below with regard to FIGS. 6A and 6B.

It should be appreciated that, although not illustrated specifically in FIG. 1, the library registry service 102 may be implemented as a software component that is executed on an appropriate computing device, such as one or more server computers in a distributed execution environment. The computing device executing the library registry service 102 might also be connected to one or more networks 122, such as a LAN, a WAN, and/or the Internet. The server 120 and the application server 118 might also be connected to the network 122 in order to enable communication between these computing devices in the manner disclosed herein.

It should also be appreciated that the configuration illustrated in FIG. 1 is merely illustrative and has been simplified for discussion purposes. Many additional software and hardware components might be utilized in embodiments to implement the functionality disclosed herein. Additionally, the embodiments disclosed herein might be implemented in a distributed execution environment in which computing resources can be created, utilized, and terminated on an as-needed basis. Additional details regarding the configuration and operation of one illustrative distributed execution environment in which the embodiments disclosed herein may be implemented is discussed in detail below with regard to FIGS. 7-9.

Figure 2:
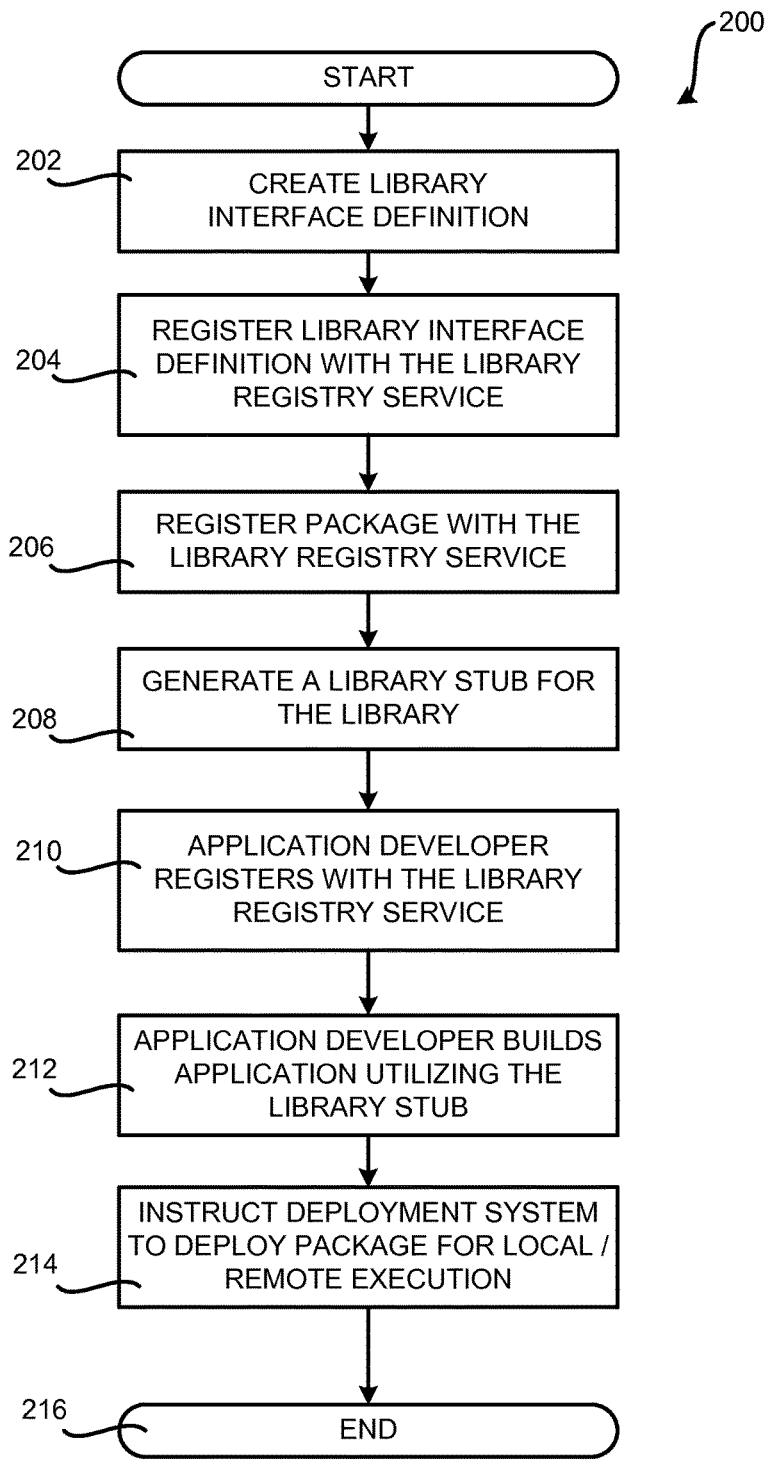
FIG. 2 is a flow diagram showing aspects of one method disclosed herein for creating and deploying a library stub for use in de-referenced execution of a package, according to one embodiment.

FIG. 2 is a flow diagram showing aspects of one routine 200 disclosed herein for creating and deploying a library stub 110 for use in de-referenced execution of a package 108, according to one embodiment. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where a library developer 104A creates a library interface definition 106. As discussed above, the library interface definition 106 describes an interface exposed by a library stub 110 that is associated with a package 108. The library interface definition 106 does not, however, implement the functionality provided by the package 108. From operation 202, the routine 200 proceeds to operation 204.

At operation 204, the library developer 104A utilizes an appropriate UI, API, or other type of interface to register the library interface definition 106 with the library registry service 102. As mentioned above, the library developer 104A might also register the package 108 with the library registry service 102 at operation 206. The library developer 104A might also provide the package 108 to the library registry service 102 for hosting. The package 108 might also be hosted in other locations, such as at software deployment system 119 or in another location. From operation 204, the routine 200 proceeds to operation 206.

At operation 206, the library developer 104A may also register the package 108 with the library registry service 102. As discussed above, the library registry service 102 might also provide an appropriate UI, API, or other type of interface through which the developer 104 can provide the package 108 that implements the functionality corresponding to the provided interface definition 106. The package 108 might be hosted at the library registry service 102, the deployment system 119, or in another location, or locations, in other embodiments.

As discussed above, the library developer 104A also provides data to the library registry service 102 indicating whether the package 108 is to be executed remotely, such as on a remote server 120, or locally. If the package 108 is to be executed remotely, the library developer 104A also specifies the remote location at which the package 108 is to be executed, such as the network address of a remote server 120, or servers, at which the package 108 is to be executed. The library registry service 102 might store this information in a registry 107 or another suitable location.

The library developer 104A might also provide information to the library registry service 102 indicating a version of the package 108 that is to be executed. This information might also be stored in the registry 107 or in another suitable location. The library developer 104A might also provide other types of information to the library registry service 102 during registration of the library interface definition and/or the package 108.

From operation 206, the routine 200 proceeds to operation 208, where the library developer 104A generates the library stub 110 for the package 108 based upon the provided library interface definition 106. The library stub 110 might also be generated by a software component in some implementations. As discussed above, the library stub 110 exposes a call interface 112 for accessing functionality provided by the package 108. Additional details regarding the functionality provided by the library stub 110 in this regard will be provided below with respect to FIG. 3.

From operation 208, the routine 200 proceeds to operation 210, where an application developer 104A may register with the library registry service 102. In particular, the library registry service 102 might provide an appropriate interface through which the application developer 104B can indicate that the application 114 uses the package 108. This information might also be stored in the registry 107. This information might also be provided to the deployment system 119 for use in deploying the package 108 to application servers 118 utilized by the application developer 104B to execute the application 114. The library registry service 102 might also provide access to the library stub 110 to the developer 104B following registration in some embodiments.

From operation 210, the routine 200 proceeds to operation 212, where the application developer 104B builds the application 114 using the library stub 110. The application 114 may then be deployed, such as for instance to an application server 118 or servers. Similarly, at operation 214 the library registry service 102 may instruct the deployment system 119 to deploy the package 108. For instance, in the example shown in FIG. 1 and described above, the library registry service 102 has deployed the package 108 to the application server 118 and to the remote server 120. From operation 214 the routine 200 proceeds to operation 216, where it ends.

Figure 3:
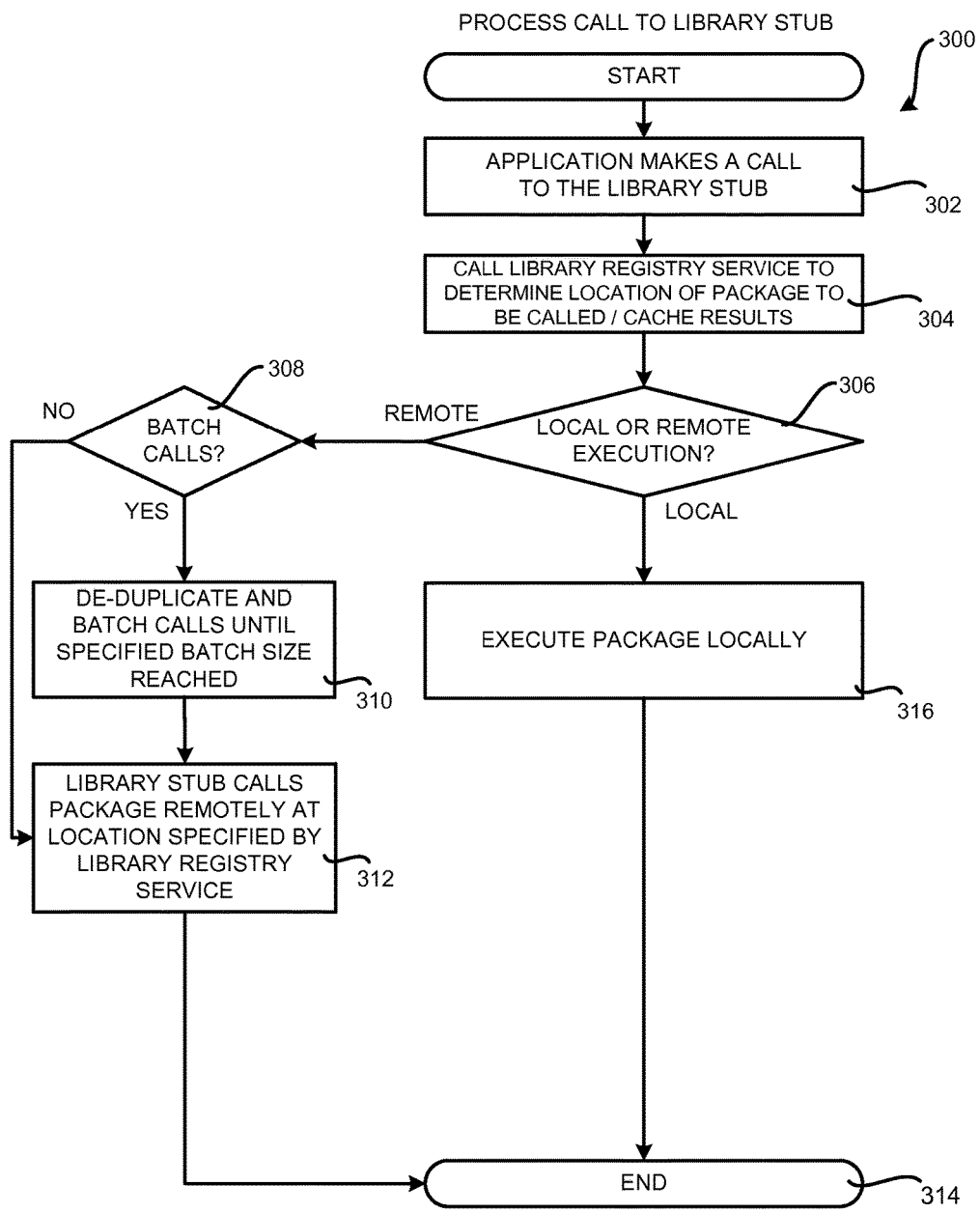
FIG. 3 is a flow diagram showing aspects of one method disclosed herein for processing a call to a library stub made by an application, according to one embodiment disclosed herein.

FIG. 3 is a flow diagram showing aspects of one method 300 disclosed herein for processing a call to a library stub 110 made by an application 114, according to one embodiment disclosed herein. The routine 300 begins at operation 302, where an application 114 makes a call to the library stub 110 to access functionality provided by the package 108. In response thereto, the routine 300 proceeds to operation 304, where the library stub 110 determines whether the package 108 is to be executed locally or remotely. For example, and as discussed above, the library stub 110 may perform a call to the library registry service 102.

As discussed above, the library registry service 102 may maintain a registry 107 indicating whether packages are to be executed locally or remotely. If a package 108 is to be executed remotely, the library registry service 107 might also store data identifying the remote network location of the package 108. Information indicating whether the package 108 is to be executed locally or remotely is provided from the library registry service 102 to the library stub 110 in response to the request from the library stub 110. If the package 108 is to be executed remotely, the location at which the package 108 is to be executed is also provided. As also discussed above, the library stub 110 might store this data in a cache for use in responding to future calls.

In another configuration, the library stub 102 might evaluate various factors in order to determine whether execution of the package 108 is to be performed locally or remotely. For example, and without limitation, this determination might be based on the status of the computing device executing the library stub 108, the status of the computing device upon which the package 108 is to be executed remotely (e.g. the server 120), the status of one or more networks, the status of the computing device executing the library registry service 102, the frequency of calls to the package 108, the size of the response generated by a call to the package 108, a "hint" or another type of indication provided by the library developer 104A and/or other factors or considerations.

If the library stub 110 determines at operation 304 that the package 108 is to be executed remotely, the routine 300 proceeds from operation 306 to operation 308. At operation 308, the library stub 110 determines if the call from the application 114 is to be batched. As discussed above, in some embodiments the library stub 110 may be configured to batch calls until a predefined number of calls have been received. The batched calls may then be provided to the package 108 in bulk. If batching is enabled, the routine 300 proceeds from operation 308 to operation 310.

At operation 310, the library stub 110 batches the call. If the batch size has been reached, the batched calls may be made to the package 108 in the manner described below. It should be appreciated that the batch size might be defined manually or determined dynamically by the library stub 110 or another component. Additionally, each call may be assigned a unique call ID so that responses can be correlated back to the correct call. Moreover, in some embodiments batched calls are de-duplicated in order to eliminate duplicate calls to the package 108. The routing 300 then proceeds from operation 310 to operation 312.

If the call received at operation 302 is not to be batched, the routine 300 proceeds from operation 308 to operation 312. At operation 312, the library stub 110 causes the package 108 to be remotely executed at the location specified by the library registry service 102. For instance, in the example shown in FIG. 1 and described above, the library stub 110 might cause the package 108 to be executed at the remote server 120 using a remote procedure call. The results of the execution of the package 108 may be returned to the library stub 108 and, in turn, to the application 114 that made the original call at operation 302. From operation 312, the routine 300 proceeds to operation 314, where it ends.

If, at operation 306, the library stub 110 determines that the package 108 is to be executed locally, the routine 300 proceeds from operation 306 to operation 316, where the library stub 110 causes the package to be executed locally (i.e. on the same computing device upon which the library stub 110 is executing). The routine 300 then proceeds from operation 316 to operation 314, where it ends.

It should be appreciated that various security mechanisms might be utilized to ensure that the package 108 is executed in a secure way. One such mechanism is described in U.S. patent application Ser. No. 14/012,520, filed on Aug. 28, 2013, and entitled "Dynamic Application Security Verification", which is assigned to the assignee of the instant patent application and expressly incorporated by reference herein in its entirety.

Figure 4:
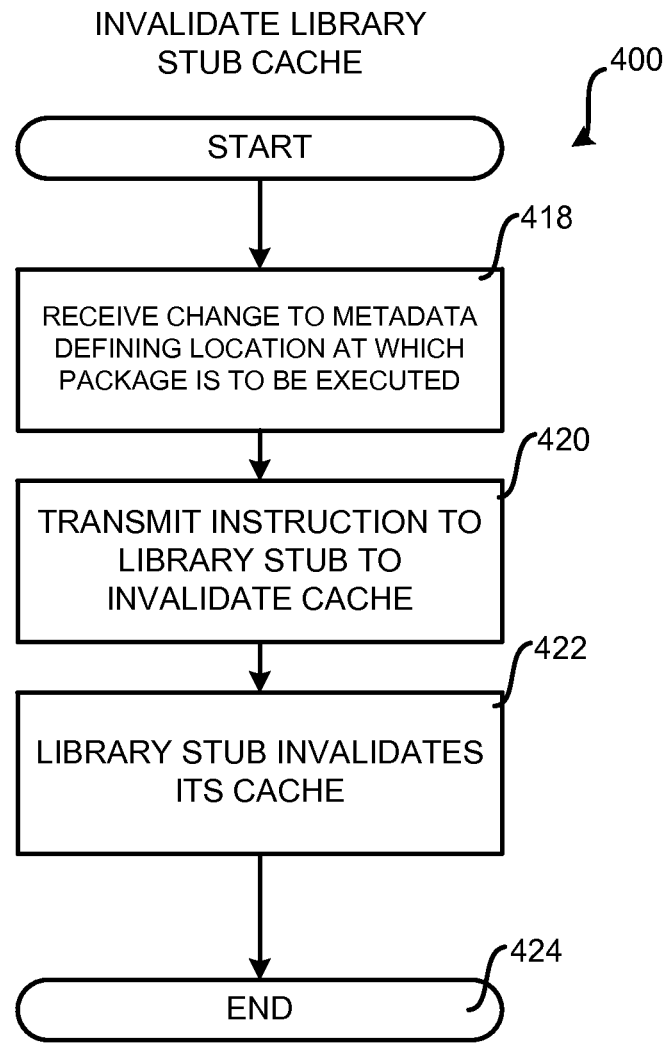
FIG. 4 is a flow diagram illustrating aspects of one mechanism disclosed herein for invalidating a cache utilized by a library stub in one embodiment disclosed herein.

FIG. 4 is a flow diagram showing a routine 400 that illustrates aspects of one mechanism disclosed herein for invalidating a cache utilized by a library stub 110 in one embodiment disclosed herein. As discussed briefly above, the library stub 110 may be configured in some embodiments to cache data received from the library registry service 102 indicating whether a package 108 is to be executed locally or remotely. If execution of the package 108 is to be performed remotely, the library stub 108 might also cache the remote location of the package 108 received from the library registry service 102. FIG. 4 illustrates one mechanism for updating the contents of this cache, for example, in response to a change to the data stored by the library registry service 102 indicating in the manner (i.e. locally or remotely) in which the package 108 is to be executed.

The routine 400 begins at operation 402, where the library registry service 102 receives a change to stored metadata that defines whether a package 108 is to be executed locally or remotely and/or a change to the location at which the package 108 is to be executed remotely. In response to such a change, the routine 400 proceeds to operation 420, where the library registry service 102 transmits an instruction to the library stub 110 to invalidate its cache.

In response to receiving the instruction at operation 420, the routine 400 proceeds from operation 420 to operation 422. At operation 422, the library stub 110 clears its cache. In this way, the next call from the application 114 will cause the library stub 110 to retrieve fresh data from the library registry service 102 indicating the location at which the package 108 is to be executed rather than utilizing cached data. From operation 422, the routine 400 proceeds to operation 424, where it ends. It should be appreciated that the mechanism shown in FIG. 4 for invalidating a cache maintained by a library stub 110 is merely illustrative and that other mechanisms might also be utilized in other configurations.

Figure 5:
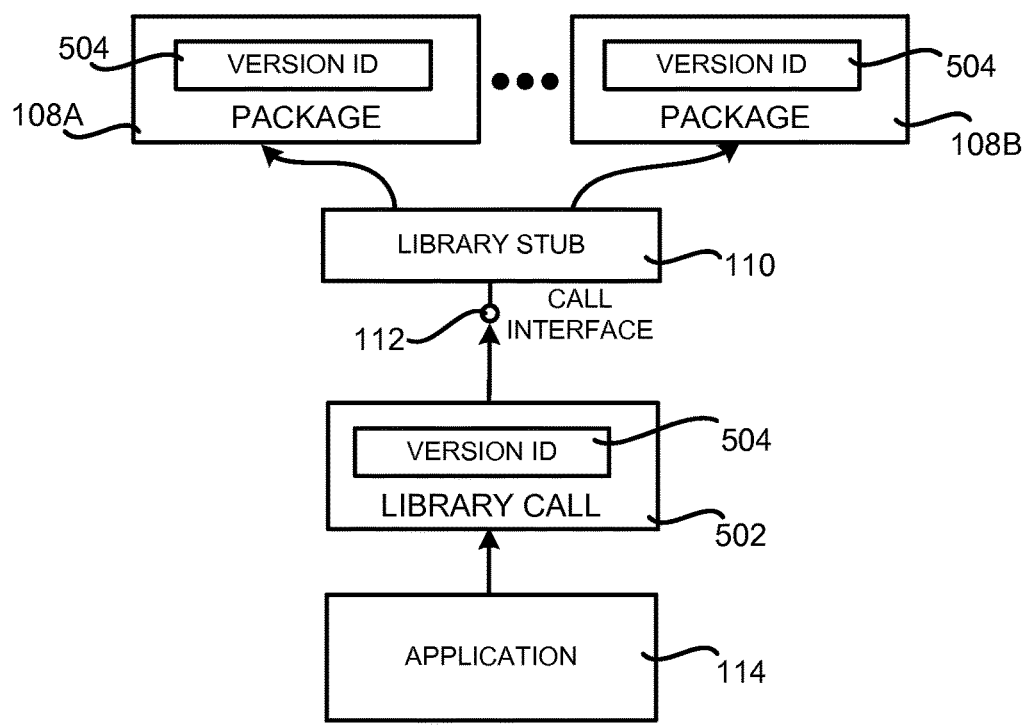
FIG. 5 is a system diagram showing aspects of the operation of a library stub for executing specified versions of a package, according to an embodiment disclosed herein.

FIG. 5 is a system diagram showing aspects of the operation of a library stub 110 for executing specified versions of a package 108, according to an embodiment disclosed herein. As discussed briefly above, in some embodiments a call 502 to the library stub 110 by an application 114 includes a version ID 504 that specifies a version of the package 108 that is to be executed in response to the library call 502. In these embodiments, the library stub 110 is configured to cause the specified version of the package 108 to be executed locally or remotely. For instance, in the example shown in FIG. 5A, the library stub 110 might cause the package 108A or the package 108B to be executed based upon the version ID 504 submitted in the call 502. This functionality may be utilized to perform A/B testing by configuring different computing devices to utilize different versions of the package 108. The results of the execution of the different versions of the package 108 can be utilized to evaluate how the different versions of the package 108 perform with respect to one another.

It should be appreciated that, in some embodiments, a call 502 made by an application 114 does not specify a version ID 504 for the package 108 to be executed. In these embodiments, various mechanisms might be utilized to determine which version of the package 108 is to be executed. For example, the library stub 110 may call the library registry service 102 for data to indicating the version of the package 108 that is to be executed.

In another configuration, the library stub 110 dynamically identifies a version of the package 108 to execute in response to the call 502. Various factors and considerations might be utilized to determine the version of the package 108 that is to be called. For example, the library stub 110 might call the most recent version of the package 108. In other embodiments, the application 114 provides constraints that may be utilized to determine the version of the package 108 that is to be executed (e.g. utilize a version of the package 108 having a version ID not less than X and not greater than Y). Other factors and/or considerations might be utilized by the library stub 110 to determine the version of the package 108 that is to be executed in response to a particular call 502.

In addition to supporting the execution of different versions of a package 108, the library stub 110 might be configured in various embodiments to support multiple versions of multiple different packages 108. The library stub 110 might also be made available in multiple versions and/or expose multiple call interfaces in some configurations. A particular version of the library stub 110 might be invoked by appending a version prefix to a call to the library stub 110. The version prefix may define how the library stub 110 will operate for a particular call. Other mechanisms might also be utilized to invoke a particular version of the library stub 110.

Figure 6B:
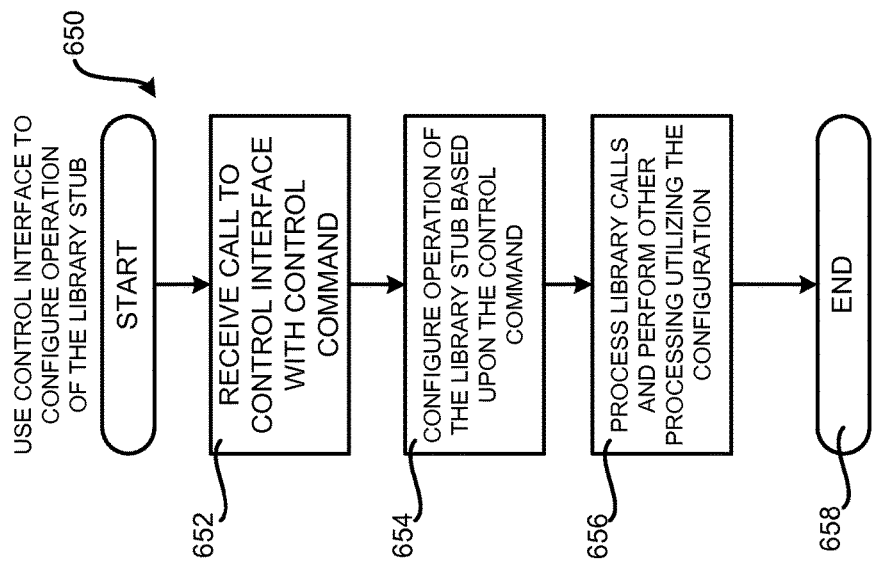
FIG. 6B is a flow diagram showing aspects of one method disclosed herein for utilizing a control interface exposed by a library stub to configure aspects of the operation of the library stub, according to one embodiment disclosed herein.
Figure 6A:
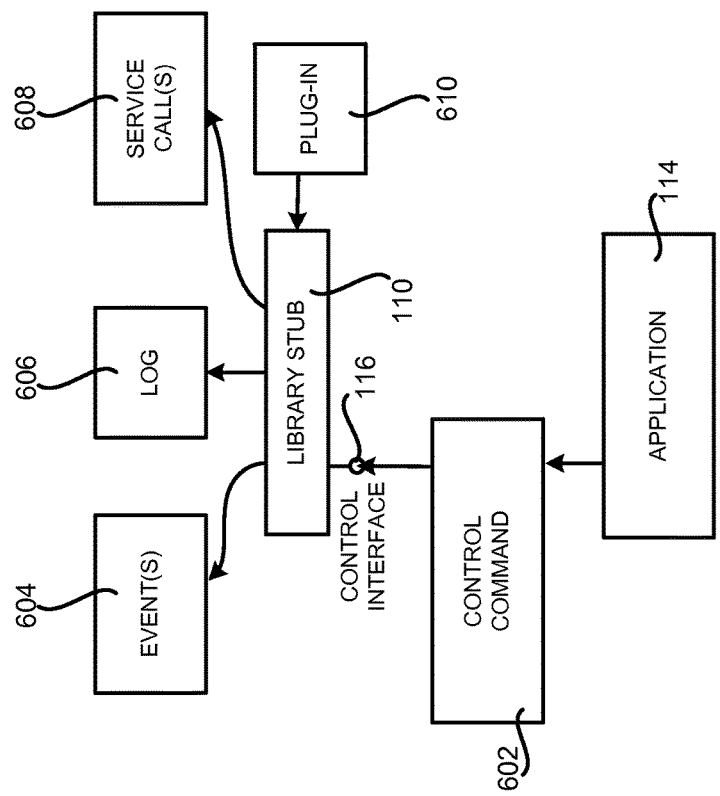
FIG. 6A is a system diagram showing aspects of the operation of a control interface exposed by a library stub for configuring aspects of the operation of the library stub, according to embodiments disclosed herein.

FIG. 6A is a system diagram showing aspects of the operation of a control interface 116 exposed by a library stub 110 for configuring aspects of the operation of the library stub 110, according to embodiments disclosed herein. As shown in FIG. 6A and described briefly above, the library stub 116 is configured in some embodiments to expose a control interface 116 through which an application 114 can submit a control command 602 in order to configure aspects of the operation of the library stub 110. For example, the control interface 116 might be an API or another type of interface through which configuration commands can be supplied.

As also discussed briefly above, the control interface 116 can be utilized to configure various aspects of the operation of the library stub 110. For example, the control interface 116 might be utilized to configure the library stub to generate a log 606 that describes various aspects of the calls to the library stub 110 and/or other aspects of the operation of the library stub 110. The control interface 116 might also be utilized to configure the library stub 110 to trigger one or more events 604 in response to receiving a call from an application 114, in response to receiving a response to a call, or in response to the occurrence of other types of conditions. It should be appreciated that the control interface 116 might be implemented as an API, as a configuration file, or in another manner. Additionally, the operation of the library stub 110 might also be performed through the inclusion of a control command 602 in a call 502 to the call interface 112. The operation of the library stub 110 might also be configured in other ways not specifically identified herein in other embodiments.

The control interface 116 might also be utilized to configure the library stub 110 to make a service call 608 to one or more other services in response to receiving a call or in response to the occurrence of other conditions. The control interface 116 might also be utilized to configure the library stub 110 to execute a plug-in 610 to the library stub 110 in response to receiving a call or in response to the occurrence of another condition, or conditions. The plug-in 610 might be configured to provide various types of processing. For example, a plug-in 610 might be configured to process a call in some manner prior to executing the requested package 108. Other types of plug-ins 610 might also be utilized.

The control interface 116 might also be utilized to configure the library stub 110 to perform latency traces, debugging operations, health monitoring, metric generation, alarm triggering, and/or to instantiate other software packages. The control interface 116 might also be utilized to configure the library stub 110 to provide other functionality not specifically identified herein.

FIG. 6B is a flow diagram showing aspects of one method 650 disclosed herein for utilizing a control interface 116 exposed by a library stub 110 to configure aspects of the operation of the library stub 110, according to one embodiment disclosed herein. The routine 650 begins at operation 652, where the library stub 110 receives a call to the control interface 116 with a control command 602 for configuring the operation of the library stub 110. The routine 650 then proceeds to operation 654.

At operation 654, the library stub 110 configures itself based upon the received control command 602. As discussed above, for instance, the library stub 110 may configure itself to perform logging to a log 606, to trigger one or more events 604 in response to the occurrence of certain conditions, to perform one or more service calls 608 in response to receiving a call or another condition, to execute one or more plug-ins 610 to the library stub 110 in response to receiving a call, and/or to provide other functionality.

Once the library stub 110 has been configured at operation 654, the routine 650 proceeds to operation 656, where the library stub 110 processes calls and performs other types of processing in accordance with the configuration performed at operation 654. The routine 650 then proceeds to operation 658, where it ends.

Figure 7:
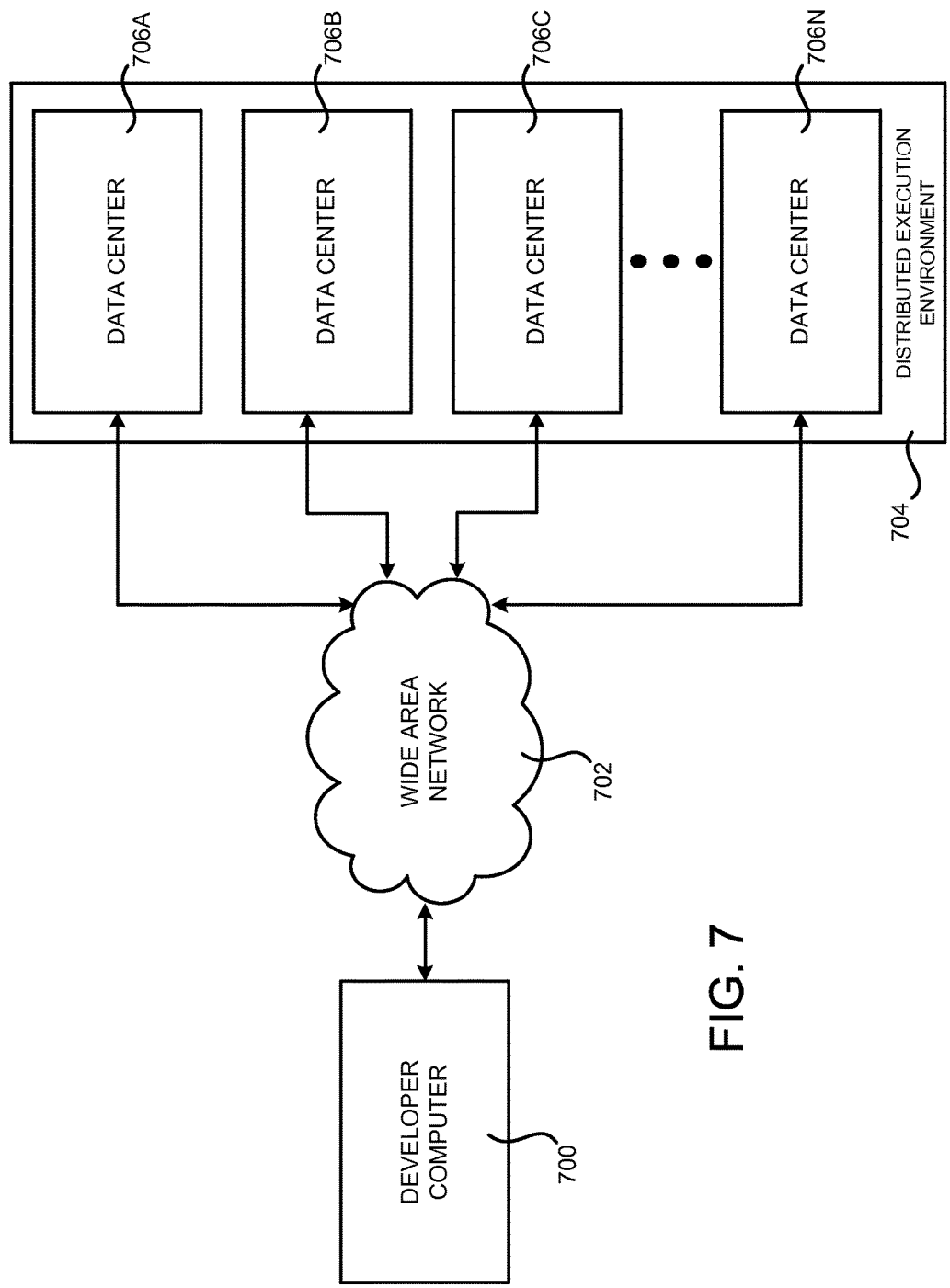
FIG. 7 is a system and network diagram that shows aspects of one illustrative operating environment for the embodiments disclosed herein that includes a distributed execution environment that may be utilized to execute the software components described herein for providing de-referenced package execution.

FIG. 7 and the following description are intended to provide a brief, general description of a suitable computing environment in which the embodiments described herein may be implemented. In particular, FIG. 7 is a system and network diagram that shows an illustrative operating environment that includes a distributed execution environment 704. As discussed briefly above, a distributed execution environment such as that shown in FIG. 7 may be utilized to implement the functionality disclosed herein for de-referenced execution of a package 108. By implementing this functionality in a distributed computing environment such as that illustrated in FIGS. 7 and 8, the services described above may be implemented in a way that is scalable, reliable, and secure.

The computing resources provided by the distributed execution environment 704 may include various types of resources, such as data processing resources, data storage resources, networking resources, data communication resources, and the like. Each type of computing resource may be general-purpose or may be available in a number of specific configurations. For example, data processing resources may be available as virtual machine instances in a number of different configurations.

The virtual machine instances may be configured to execute applications, including Web servers, application servers, media servers, database servers, and other types of applications. The virtual machine instances might also be configured to execute the library registry service 102, the application 114, the library stub 110, the package 108 and/or any of the other software components described herein. Data storage resources may include file storage devices, block storage devices, and the like. Each type or configuration of a computing resource may be available in different sizes, such as large resources, consisting of many processors, large amounts of memory, and/or large storage capacity, and small resources consisting of fewer processors, smaller amounts of memory, and/or smaller storage capacity.

As also mentioned above, the computing resources provided by the distributed execution environment 704 are enabled in one implementation by one or more data centers 706A-706N (which may be referred to herein singularly as "a data center 706" or collectively as "the data centers 706"). The data centers 706 are facilities utilized to house and operate computer systems and associated components. The data centers 706 typically include redundant and backup power, communications, cooling, and security systems. The data centers 706 might also be located in geographically disparate locations. One illustrative configuration for a data center 706 that may be utilized to implement the technologies disclosed herein will be described below with regard to FIG. 8.

Users of the distributed execution environment 704 may access the computing resources provided by the data centers 706 over a suitable data communications network, such as a Wide Area Network ("WAN") 702. For example, and as shown in FIG. 7, a developer 104 might utilize an appropriate developer computer 700 to access the services described herein. Although a WAN 702 is illustrated in FIG. 7, it should be appreciated that a local-area network ("LAN"), the Internet, or any other networking topology known in the art that connects the data centers 706 other networks and/or computing devices, such as the developer computer 700, may be utilized. It should also be appreciated that combinations of such networks might also be utilized.

Figure 8:
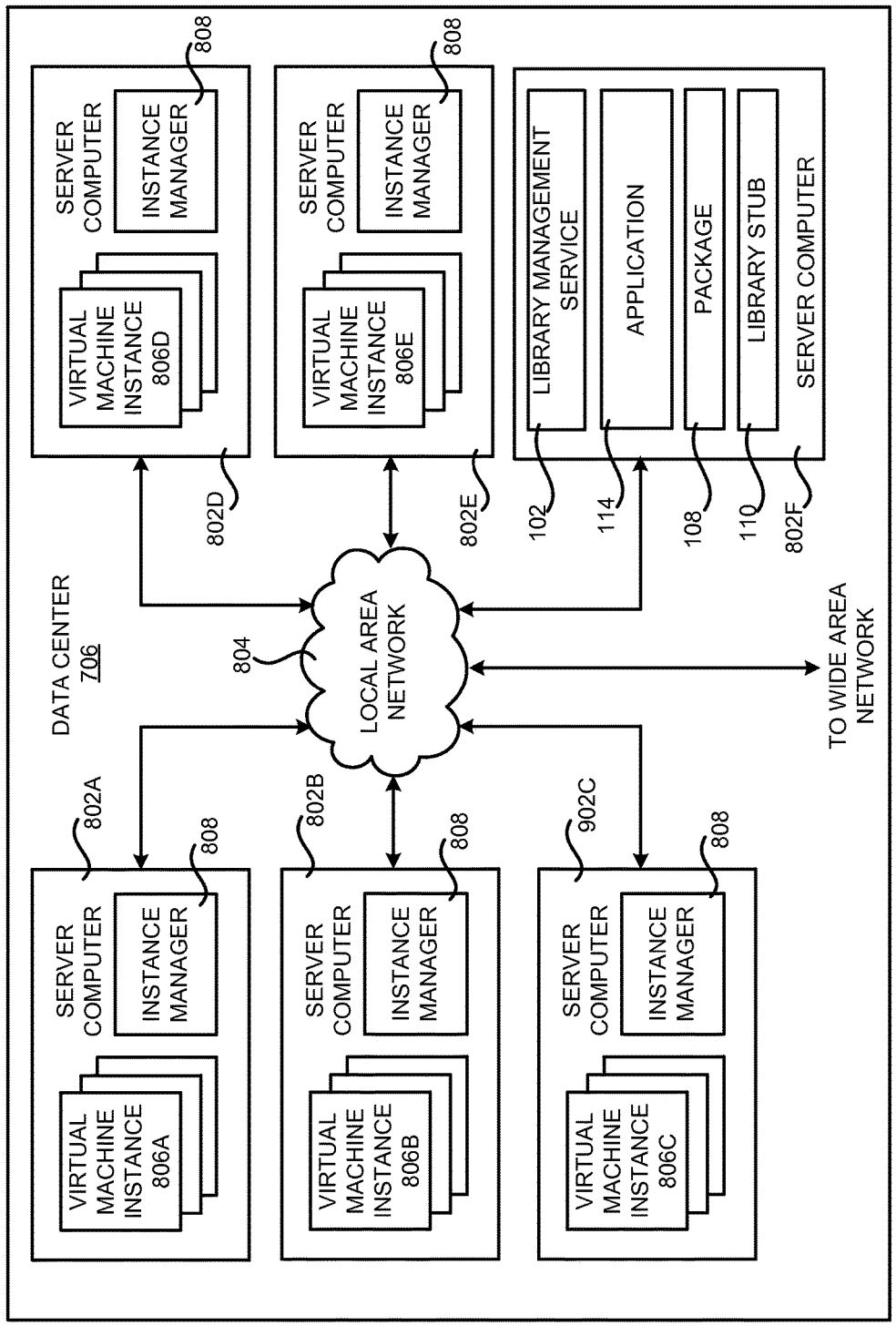
FIG. 8 is a computing system diagram that illustrates one configuration for a data center that may be utilized to implement aspects of the technologies disclosed herein for de-referenced package execution, according to one embodiment.

FIG. 8 is a computing system diagram that illustrates one configuration for a data center 706 that implements aspects of the distributed execution environment 704 for implementing the technologies disclosed herein. The example data center 706 shown in FIG. 8 includes several server computers 802A-802F (which may be referred to herein singularly as "a server computer 802" or in the plural as "the server computers 802"). The server computers 802 may be standard tower or rack-mount server computers configured appropriately for providing the computing resources described herein. For example, in one implementation the server computers 802 are configured to provide virtual machine instances 806A-806E for executing the software components described above.

As known in the art, a virtual machine instance is an instance of a software implementation of a machine (i.e. a computer) that executes programs like a physical machine. Each of the servers 802 may be configured to execute an instance manager 808 capable of instantiating and managing the virtual machine instances 806. The instance manager 808 might be a hypervisor or another type of program configured to enable the execution of multiple virtual machine instances 806 on a single server 802, for example.

It should be appreciated that although the embodiments disclosed herein are described primarily in the context of virtual machine instances 806, other types of computing resources can be utilized to implement the various concepts and technologies disclosed herein. For example, the technologies disclosed herein might be implemented using hardware resources, data storage resources, data communications resources, networking resources, database resources, and other types of computing resources provided by the data center 806.

The server computers 802 may be configured to execute some or all of the software components described above. For example, one or more server computers, such as the server computer 802F, may be configured to execute the library registry service 102, the library stub 114, the application 114, and/or the package 108. These services might be executed in virtual machine instances 806 or directly on hardware as illustrated in FIG. 8.

Resources in the data center 706 used to provide the functionality described above, such as virtual machine instances 806, may be scaled in response to demand. In this regard, it should be appreciated that while the software components described above are illustrated as executing within the distributed execution environment 704, computing systems that are external to the distributed execution environment 704 might also be utilized to execute some or all of these components. Other configurations might also be utilized.

In the example data center 706 shown in FIG. 8, an appropriate LAN 804 is utilized to interconnect the server computers 802A-802F. The LAN 804 is also connected to the WAN 702 illustrated in FIG. 7. It should be appreciated that the configuration and network topology illustrated in FIGS. 7 and 8 has been greatly simplified and that many more computing systems, networks, and networking devices may be utilized to interconnect the various computing systems disclosed herein. Appropriate load balancing devices and/or software modules might also be utilized for balancing a load between each of the data centers 706A-706N, between each of the server computers 802A-802F in each data center 706, and between virtual machine instances 806 provided by the server computers 802A-802F.

It should be appreciated that the data center 706 described in FIG. 8 is merely illustrative and that other implementations might be utilized. In particular, some or all of the functionality described herein as being performed by the library registry service 102, the library stub 110, the application 114, and the package 108 might be performed by one another, might be performed by other components, or might be performed by a combination of these or other components. Additionally, it should be appreciated that the functionality provided by these components might be implemented in software, hardware, or a combination of software and hardware. Other implementations should be apparent to those skilled in the art.

Figure 9:
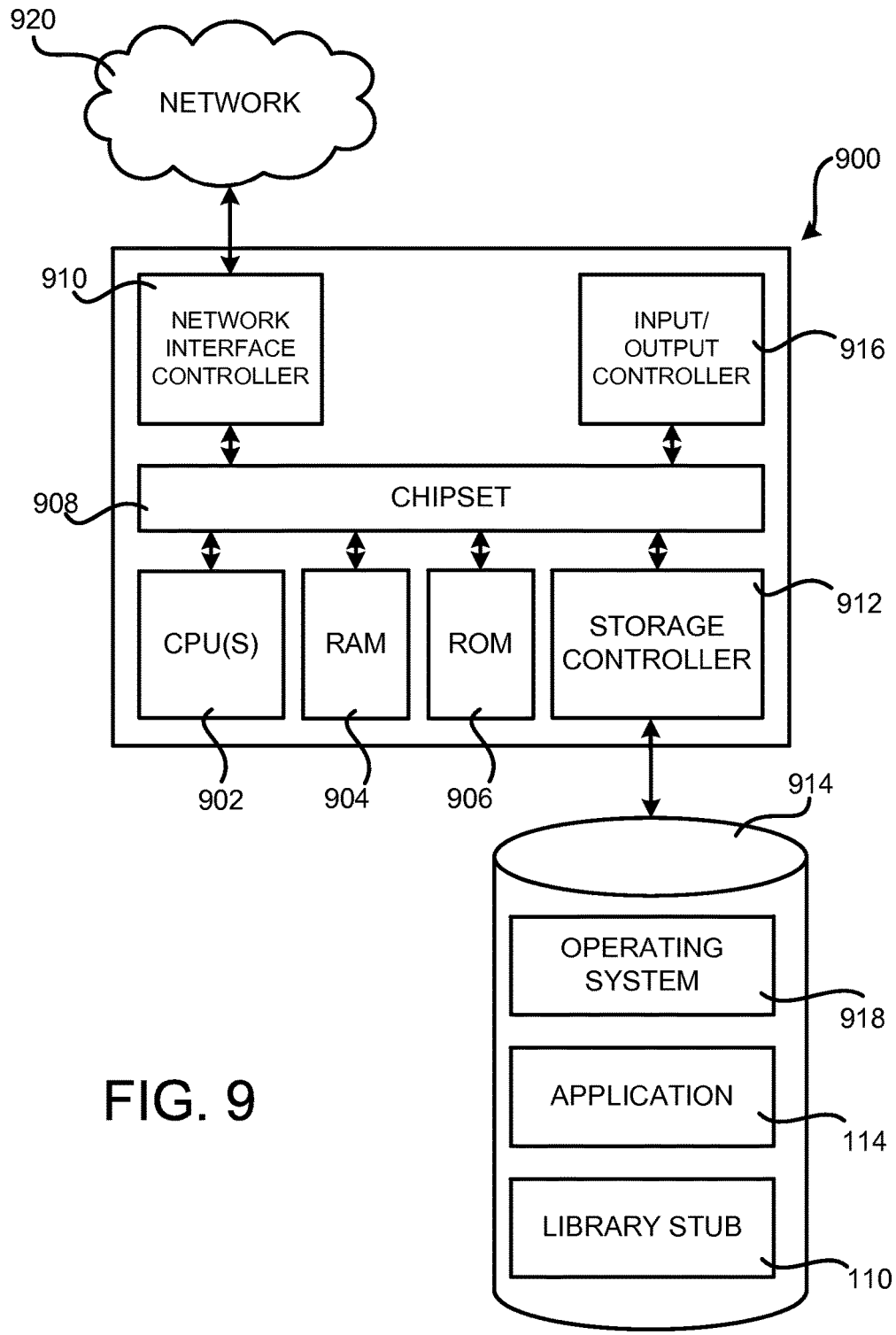
FIG. 9 is a computer architecture diagram showing an illustrative computer hardware architecture for implementing computing devices described in embodiments presented herein.

FIG. 9 shows an example computer architecture for a computer 900 capable of executing the software components described herein. The computer architecture shown in FIG. 9 illustrates a conventional server computer, workstation, desktop computer, laptop, network appliance, PDA, electronic book reader, digital cellular phone, or other computing device, and may be utilized to execute any aspects of the software components presented herein. For example, and without limitation, the computer architecture shown in FIG. 9 might be utilized to implement the application server 118, the remote server 120, the developer computer 700, and/or a computing device for executing the library registry service 102.

The computer 900 includes a baseboard, or "motherboard," which is a printed circuit board to which a multitude of components or devices may be connected by way of a system bus or other electrical communication paths. In one illustrative embodiment, one or more central processing units ("CPUs") 902 operate in conjunction with a chipset 908. The CPUs 902 are standard programmable processors that perform arithmetic and logical operations necessary for the operation of the computer 900.

The CPUs 902 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 908 provides an interface between the CPUs 902 and other components and devices on the baseboard. For instance, the chipset 908 may provide an interface to a random access memory ("RAM") 904, used as the main memory in the computer 900. The chipset 908 may further provide an interface to a computer-readable storage medium such as a read-only memory ("ROM") 906 or non-volatile RAM ("NVRAM") for storing basic routines that help to startup the computer 900 and to transfer information between the various components and devices. The ROM 906 or NVRAM may also store other software components necessary for the operation of the computer 900 in accordance with the embodiments described herein.

According to various embodiments, the computer 900 may operate in a networked environment using logical connections to remote computing devices and computer systems through the network 920, such as a LAN, a WAN, the Internet, or any other networking topology known in the art that connects the computer 900 to remote computers. The chipset 908 includes functionality for providing network connectivity through a network interface controller ("NIC") 910, such as a gigabit Ethernet adapter. The NIC 910 is capable of connecting the computer 900 to other computing devices over the network 920. It should be appreciated that any number of NICs 910 may be present in the computer 900, connecting the computer 900 to various types of networks and remote computer systems.

The computer 900 may be connected to a mass storage device 914 that provides non-volatile storage for the computer 900. The mass storage device 914 may store system programs, application programs, other program modules, and data, which are described in greater detail herein. The mass storage device 914 may be connected to the computer 900 through a storage controller 912 connected to the chipset 908. The mass storage device 914 may consist of one or more physical storage units. The storage controller 912 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 900 may store data on the mass storage device 914 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 914 is characterized as primary or secondary storage, and the like.

For example, the computer 900 may store information to the mass storage device 914 by issuing instructions through the storage controller 912 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 914 by detecting the physical states or characteristics of one or more particular locations within the physical storage units.

In addition to the mass storage device 914 described above, the computer 900 may have access to other computer-readable storage media to store and retrieve information, such as program modules, data structures, or other data. It should be appreciated by those skilled in the art that computer-readable storage media can be any available non-transitory media that may be accessed by the computer 900. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 914 may store an operating system 918 utilized to control the operation of the computer 900. According to one embodiment, the operating system comprises the LINUX operating system. According to another embodiment, the operating system comprises one of the family of WINDOWS operating systems from MICROSOFT Corporation of Redmond, Wash. According to other embodiments, the operating system comprises the UNIX operating system, the LINUX operating system, or a variant thereof. It should be appreciated that other operating systems may also be utilized. The mass storage device 914 may store other system or application programs and data utilized by the computer 900. For example, when utilized to implement the application server 118, the mass storage device 914 may store the application 114 and the library stub 110. The mass storage device 912 might also be utilized to store program code for implementing any of the other components described above in regard to FIGS. 1-8.

In one embodiment, the mass storage device 914 or other computer-readable storage media may be encoded with computer-executable instructions that, when loaded into the computer 900, may transform the computer from a general-purpose computing system into a special-purpose computer capable of implementing the embodiments described herein. These computer-executable instructions transform the computer 900 by specifying how the CPUs 902 transition between states, as described above. According to one embodiment, the computer 900 may have access to computer-readable storage media storing computer-executable instructions which, when executed by the computer 900, perform some or all of the operations described above with respect to FIGS. 2-4 and 6B.

The computer 900 might also include one or more input/output controllers 916 for receiving and processing input from a number of input devices, such as a keyboard, a mouse, a touchpad, a touch screen, an electronic stylus, or other type of input device. Similarly, an input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that various concepts and technologies for de-referenced package execution have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for executing a package, the method comprising:
    receiving, at a first computing device, an interface definition that defines an interface for calling a library stub configured to provide functionality for de-referenced execution of the package;
    receiving, at the first computing device, execution location data that defines whether the package is to be executed locally or remotely, the execution location data including data indicating a frequency of calls to the package and a size of a response generated by the call to the package;
    storing the interface definition and the execution location data;
    subsequent to the storing the interface definition and the execution location data, receiving, from a second computing device executing an application and the library stub, a first request for the execution location data;
    in response to the first request, providing a first response to the library stub that includes the execution location data, the first response to provide the functionality to the application based on execution of the package;
    subsequent to the providing the first response, receiving an updated version of the package that includes one or more changes to the package;
    storing the updated version of the package as an updated package;
    subsequent to the storing the updated package, receiving, from the second computing device, a second request for the execution location data; and
    in response to the second request, providing a second response to the library stub that includes the execution location data, the second response to provide the functionality to the application based on execution of the updated package without the application being rebuilt or redeployed on the second computing device.

2. The computer-implemented method of claim 1, wherein the execution location data comprises data identifying a remote location at which the package is to be executed.

3. The computer-implemented method of claim 2, wherein the execution location data further comprises version data defining which version of the package is to be executed.

4. The computer-implemented method of claim 3, further comprising instructing a deployment system to deploy the package to the remote location at which the package is to be executed.

5. The computer-implemented method of claim 3, further comprising instructing a deployment system to deploy the package to the second computing device.

6. The computer-implemented method of claim 1, further comprising transmitting an instruction to the second computing device to invalidate a cache storing the execution location data that defines whether the package is to be executed locally or remotely.

7. A system, comprising:
    a library registry service comprising a first processor and a first non-transitory computer-readable storage medium storing instructions executable on the first processor for:
        receiving a registration request to register an interface definition for a package, the registration request comprising execution location data that predefines one or more conditions for use in determining whether the package is to be executed locally or remotely,
        storing the execution location data, and
        receiving and responding to requests for the execution location data; and an application server comprising a second processor and a second non-transitory computer-readable storage medium storing instructions executable on the second processor for:
        executing an application configured to call upon a library stub that exposes an interface defined by the interface definition to the application,
        receiving a call to the library stub from the application, and
        in response to receiving the call, determining if the package is to be executed remotely at a remote server associated with the package or locally at the application server based upon the execution location data, a frequency of calls to the package, and a size of a response generated by the call to the package, and:
            in response to determining that the package is to be executed locally, causing the package to be executed at the application server, or
            in response to determining that the package is to be executed remotely, determining a network address of the remote server associated with the package by way of the library registry service and causing the package to be executed at the remote server.

8. The system of claim 7, wherein determining if the package is to be executed remotely at the remote server or locally at the application server comprises transmitting, to the library registry service, a request for the execution location data.

9. The system of claim 7, wherein the execution location data comprises the network address of the remote server at which the package is to be executed.

10. The system of claim 9, wherein the application server is configured to cache the execution location data identifying the remote server at which the package is to be executed.

11. The system of claim 7, wherein determining if the package is to be executed remotely at the remote server or locally at the application server is based on one or more of a status of at least one of:

the library registry service,
the remote server, or
the application server.

12. The system of claim 7, wherein the call specifies a version identifier for the package and wherein a version of the package having the specified version identifier is executed locally or remotely.

13. A computer-implemented method for executing a package, the method comprising:
receiving a registration request to register an interface definition for the package, the registration request comprising execution location data that predefines conditions for use in determining whether the package is to be executed locally or remotely,
storing the execution location data;
receiving one or more requests for the execution location data; executing an application configured to call upon a library stub that exposes an interface defined by the interface definition to the application;
receiving a call to the library stub from the application executing on an application server; and
in response to receiving the call to the library stub, determining, based on the conditions, if the package is to be executed remotely from the application server or locally at the application server, the conditions including a current level of computing resources of the application server, a frequency of calls to the package, and a size of a response generated by the call to the package, and:
in response to determining that the package is to be executed locally at the application server, causing the package to be executed locally at the application server; or
in response to determining that the package is to be executed remotely from the application server, causing the package to be executed remotely from the application server at a remote server associated with the package.

14. The computer-implemented method of claim 13, wherein determining if the package is to be executed remotely from the application server or locally at the application server comprises transmitting a request to a library registry service for data indicating whether the package is to be executed locally or remotely from the application server.

15. The computer-implemented method of claim 14, wherein the method further comprises:
storing the data; and
invalidating a cache in response to an instruction received from the library registry service.

16. The computer-implemented method of claim 13, wherein determining if the package is to be executed remotely from the application server or locally at the application server is based on a status of the application server.

17. The computer-implemented method of claim 13, wherein the call to the library stub specifies a version identifier for the package and wherein a version of the package having the version identifier is executed locally or remotely.

18. The computer-implemented method of claim 13, wherein the library stub is further configured to batch two or more calls to the library stub prior to executing the package locally at the application server or remotely from the application server.

19. The computer-implemented method of claim 13, wherein the library stub is further configured to expose a control interface for receiving commands to configure operation of the library stub.

20. The computer-implemented method of claim 19, wherein the control interface can be utilized to configure the library stub to log calls to the library stub from the application, trigger one or more events in response to receiving the call from the application, perform a service call in response to receiving the call from the application, or execute a plug-in to the library stub in response to receiving the call from the application.

* * * * *